(12) United States Patent
Pathirane et al.

(10) Patent No.: US 8,108,730 B2
(45) Date of Patent: Jan. 31, 2012

(54) DEBUGGING A MULTIPROCESSOR SYSTEM THAT SWITCHES BETWEEN A LOCKED MODE AND A SPLIT MODE

(75) Inventors: Chiloda Ashan Senerath Pathirane, Haverhill (GB); Antony John Penton, Cambridge (GB)

(73) Assignee: ARM Limited, Cambridge (GB)

( * ) Notice: Subject to any disclaimer, the term of this patent is extended or adjusted under 35 U.S.C. 154(b) by 71 days.

(21) Appl. No.: 12/656,248

(22) Filed: Jan. 21, 2010

(65) Prior Publication Data

US 2011/0179309 A1 Jul. 21, 2011

(51) Int. Cl.
*G06F 11/00* (2006.01)
(52) U.S. Cl. ......................................................... 714/31
(58) Field of Classification Search .............. 714/4.11, 714/4.12, 4.3, 4.4, 10–13, 25–28, 30–33, 714/37, 38.1, 41, 45, 48, 57
See application file for complete search history.

(56) References Cited

U.S. PATENT DOCUMENTS

| | | | |
|---|---|---|---|
| 6,330,701 B1 | 12/2001 | Rosendahl et al. | |
| 6,363,453 B1 * | 3/2002 | Esposito et al. | 711/2 |
| 6,434,712 B1 * | 8/2002 | Urban et al. | 714/12 |
| 6,615,366 B1 | 9/2003 | Grochowski et al. | |
| 6,640,313 B1 | 10/2003 | Quach | |
| 7,206,966 B2 * | 4/2007 | Barr et al. | 714/25 |
| 7,222,064 B1 * | 5/2007 | Sollom et al. | 703/26 |
| 7,383,463 B2 * | 6/2008 | Hayden et al. | 714/4.11 |
| 2002/0073357 A1 | 6/2002 | Dhong et al. | |
| 2002/0133751 A1 | 9/2002 | Nair et al. | |
| 2003/0120896 A1 * | 6/2003 | Gosior et al. | 712/32 |
| 2004/0003021 A1 | 1/2004 | Safford et al. | |
| 2004/0019771 A1 | 1/2004 | Quach | |
| 2004/0025078 A1 | 2/2004 | Nagano et al. | |
| 2005/0240793 A1 | 10/2005 | Safford et al. | |
| 2005/0240810 A1 | 10/2005 | Safford et al. | |
| 2005/0240811 A1 | 10/2005 | Safford et al. | |
| 2006/0107117 A1 | 5/2006 | Michaelis et al. | |
| 2007/0088979 A1 | 4/2007 | Pomaranski et al. | |
| 2007/0240028 A1 * | 10/2007 | Davies | 714/799 |
| 2010/0077259 A1 * | 3/2010 | Inoue et al. | 714/45 |
| 2010/0106448 A1 * | 4/2010 | Satterfield et al. | 702/117 |

OTHER PUBLICATIONS

U.S. Appl. No. 12/656,247, filed Jan. 21, 2010, Pathirane et al.
U.S. Appl. No. 12/656,246, filed Jan. 21, 2010, Pathirane et al.
Kottke et al., "A Reconfigurable Generic Dual-Core Architecture", *IEEE Computer Society*, 2006, pp. 45-54.
Beleani et al., "Fault-Tolerant Platforms for Automotive Safety-Critical Applications", *CASES '03*, Nov. 2, 2003, 8 pages.
Notice of Allowance mailed Jul. 18, 2011 in co-pending U.S. Appl. No. 12/656,247.

\* cited by examiner

*Primary Examiner* — Nadeem Iqbal
(74) *Attorney, Agent, or Firm* — Nixon & Vanderhye P.C.

(57) ABSTRACT

A data processing system 2 is provided with multiple processors 4, 6 which can operate in either a split-mode in which each processor executes its own program flow or a locked-mode in which the processors execute the same program flow. Debug circuitry 8, 10 is associated with each of the processors. In an emulation-locked mode of operation, one of the processors 4 is active and its respective debug circuitry 8 is active to update the debug state data so as to debug the locked mode code. At the same time, the second processor 6 is held inactive and its state is maintained as well as the debug state data of the debug circuitry 10 within that inactive processor. This maintains the debug state data of the processor 6 across entry and exit to the locked mode of operation.

19 Claims, 3 Drawing Sheets

|  | Processor0 | Processor1 | Debug0 | Debug1 |
|---|---|---|---|---|
| Split Mode | active | active | inactive | inactive |
| Debug-Split Mode | active | active | active | active |
| Locked Mode | active ⇌ active (locked) | | inactive | inactive |
| Debug-Locked Mode | active ⇌ active (locked) | | active ⇌ active (normalized & locked) | |
| Emulation-Locked Mode | active | holding & inactive | active | holding & inactive |

FIG. 2

DEBUGGING A MULTIPROCESSOR SYSTEM THAT SWITCHES BETWEEN A LOCKED MODE AND A SPLIT MODE

BACKGROUND OF THE INVENTION

1. Field of the Invention

This invention relates to data processing systems. More particularly, this invention relates to data processing systems including a plurality of processors which operate in both a split mode and a locked mode.

2. Description of the Prior Art

It is known to provide data processing systems having a plurality of processors and which operate in both a split mode and a locked mode. As an example, Fault tolerant Platforms for Automotive Safety critical applications (Baleani, Ferrari, et al, 2003) discloses such a system which operates in both a split mode and a locked mode. Such systems give the advantage of redundancy and fault tolerance when operating in the locked mode and yet permit higher multiprocessor performance when operating in the split mode. When operating in the locked mode, the processors must track each other accurately on a cycle-by-cycle basis (although there may be some offset). In order to achieve this, the processors are normalised before entering the locked mode. This typically involves running a sequence of normalising program instructions to place state parameters accessible within the programming model into a predetermined state as well as performing a hardware reset to normalise state parameters which are not accessible in the software model.

In order to ensure complete normalisation between the processors, the debug mechanisms in each of the processors will also be normalised upon entry into the locked mode. This will overwrite any debug state present before the switch into the locked mode and makes it difficult to debug the switching process itself.

SUMMARY OF THE INVENTION

Viewed from one aspect the present invention provides an apparatus for processing data comprising:

a plurality of processors, each processor including debug circuitry having debug state data and configured to perform debug operations upon said processor;

comparison circuitry configured to compare processing results of different processors of said plurality of processors; and debug control circuitry configured to control said debug circuitry of each of said plurality of processors; wherein said plurality of processors and said debug control circuitry are configured to provide:

(i) a locked mode of operation in which each of said plurality of processors separately and during a corresponding processing cycle executes a common processing operation to generate respective processing results, said processing results of different processors being compared by said comparison circuitry to identify incorrect operation; and (ii) a split mode of operation in which each of said plurality of processors separately and during said corresponding processing cycle executes a different processing operation to generate respective different processing results; and (iii) an emulation-locked mode in which at least one processor of said plurality of processors is an active processor having debug circuitry active to perform debug operations upon said active processor including changing said debug state data of said debug circuitry of said active processor and at least one processor of said plurality of processors is an inactive processor that is inactive and maintains said debug state data of said inactive processor unaltered.

The present technique recognises that when debugging the system it is not important to have the fault tolerance in place as debugging is normally performed independently of deployment to any safety critical environment. Accordingly, it is not necessary for all of the processors to be tracking one another when seeking to debug the locked mode, or more particularly to debug the switch into and out of the locked mode. The emulation-locked mode is such that at least one processor of the plurality of processors is active and has its debug circuitry active to perform debug operations in the emulation-locked mode while at least one further processor of the plurality of processors is held inactive and maintains its debug state unaltered. The inactive processor would normally track the active processor, but in the emulation-locked mode it is recognised that this is not necessary when debugging and it is more useful for the inactive processor to maintain its debug state across the transition into and out of the locked mode. This makes it possible to debug this entry and exit to the locked mode and means that when the inactive processor resumes processing upon a switch from the emulation-locked mode to the split mode the debugging of this processor can continue without a loss of its debug state from before entry into the emulation-locked mode. The debug state can, for example, also include breakpoint/watchpoint addresses and other debug configuration. Preserving this configuration when entering the emulation-locked mode is of value when attempting to debug the switching code.

The split mode may also be provided with debug facilities, either full-time in the split mode itself or as a separate debug-split mode, in which each of the processors of the plurality of processors is an active processor and respective debug circuitry performs debug operations upon these active processors including changing the debug state data.

It will be appreciated that the total number of processors may vary. It may be that two processors are provided and that in the emulation-locked mode a single processor of the plurality of processors is an active processor. All of the other processors are held inactive and preserve the debug state. The particular processor which is active in the emulation-locked mode may be varied as this active processor may change its debug state data in the emulation-locked mode and so it may be desirable that another processor is the active processor at some times to permit debug coverage of the transition between the split mode and the locked mode for all of the processors.

As well as the emulation-locked mode, the system may also provide a debug-locked mode in which each of the processors is an active processor and tracks one another whilst updating their debug state data. This may be the locked mode itself or may be separately provided as a debug-locked mode. This mode is useful for debugging the locked mode itself.

When operating in the debug-locked mode, changes made in the debug state data of one of the processors are made in a corresponding manner to the remainder of the processors such that the processors all remain in lock-step with each other.

In order that the inactive processor in the emulation-locked mode can maintain its state there is provided clamping circuit active in the emulation-locked mode to clamp output signals of each inactive processor to predetermined values. In this way, the inactive processor can be prevented from influencing the operation of the remainder of the system. In a similar manner the clamping circuitry may also serve in the emulation-locked mode to hold input signal values of each inactive processor at their original levels in order to maintain the state of the inactive processor within the emulation-locked mode.

The inactive processor(s) in the emulation-locked mode may maintain aspects of the configuration of the active processor(s) in the split mode (e.g. cache configuration) as this will help maintain the state before the switch to the locked mode.

In order to facilitate the preservation of state of the inactive processor across entry and exit from the emulation-locked mode, this may be arranged to take place at a common point within the program flow for that inactive processor. This gives the illusion to the inactive processor that it halts execution for the period of time that the emulation-locked mode is in force and then resumes execution at the same point following exit from the emulation-locked mode.

It is appropriate that switching of mode should take place between the split mode and the locked mode and between the split mode and the emulation-locked mode. Switching between the locked mode and the emulation-locked mode directly would not normally be permitted.

It will be appreciated that the number of processors provided could vary. The greater the number of processors, then the greater the level of redundancy in the locked mode. However, a good balance between performance and redundancy is achieved when the plurality of processors comprise two processors.

Switching from the split mode to the locked mode may be made by placing each of the processor in to a quiescent state and when all of the processors are in the quiescent state issuing a wake-up event to trigger a state of processing in the locked mode.

Viewed from another aspect the present invention provides an apparatus for processing data comprising:

a plurality of processor means for performing-processing operations, each processor means including debug means for performing debug operations upon said processor means and having debug state data;

comparison means for comparing processing results of different processors means of said plurality of processor means; and debug control means for controlling said debug means of each of said plurality of processor means; wherein said plurality of processor means and said debug control means provide:

(i) a locked mode of operation in which each of said plurality of processor means separately and during a corresponding processing cycle executes a common processing operation to generate respective processing results, said processing results of different processor means being compared by said comparison means to identify incorrect operation; and (ii) a split mode of operation in which each of said plurality of processor means separately and during said corresponding processing cycle executes a different processing operation to generate respective different processing results; and (iii) an emulation-locked mode in which at least one processor means of said plurality of processor means is an active processor means having debug means active to perform debug operations upon said active processor means including changing said debug state data of said debug means of said active processor means and at least one processor means of said plurality of processor means is an inactive processor means that is inactive and maintains said debug state data of said inactive processor means unaltered.

Viewed from a further aspect the present invention provides a method of operating an apparatus for processing data having a plurality of processors, each processor including debug circuitry having debug state data and configured to perform debug operations upon said processor, comparison circuitry configured to compare processing results of different processors of said plurality of processors and debug control circuitry configured to control said debug circuitry of each of said plurality of processors, said method comprising:

operating said plurality of processors and said debug control circuitry to provide:

(i) a locked mode of operation in which each of said plurality of processor means separately and during a corresponding processing cycle executes a common processing operation to generate respective processing results, said processing results of different processor means being compared by said comparison means to identify incorrect operation; and (ii) a split mode of operation in which each of said plurality of processor means separately and during said corresponding processing cycle executes a different processing operation to generate respective different processing results; and (iii) an emulation-locked mode in which at least one processor means of said plurality of processor means is an active processor means having debug means active to perform debug operations upon said active processor means including changing said debug state data of said debug means of said active processor means and at least one processor means of said plurality of processor means is an inactive processor means that is inactive and maintains said debug state data of said inactive processor means unaltered.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 is a table indicating the status of the various processors and debug circuitry in different modes of operation supported by the system of FIG. 1.

DESCRIPTION OF EMBODIMENTS

Figure 1:
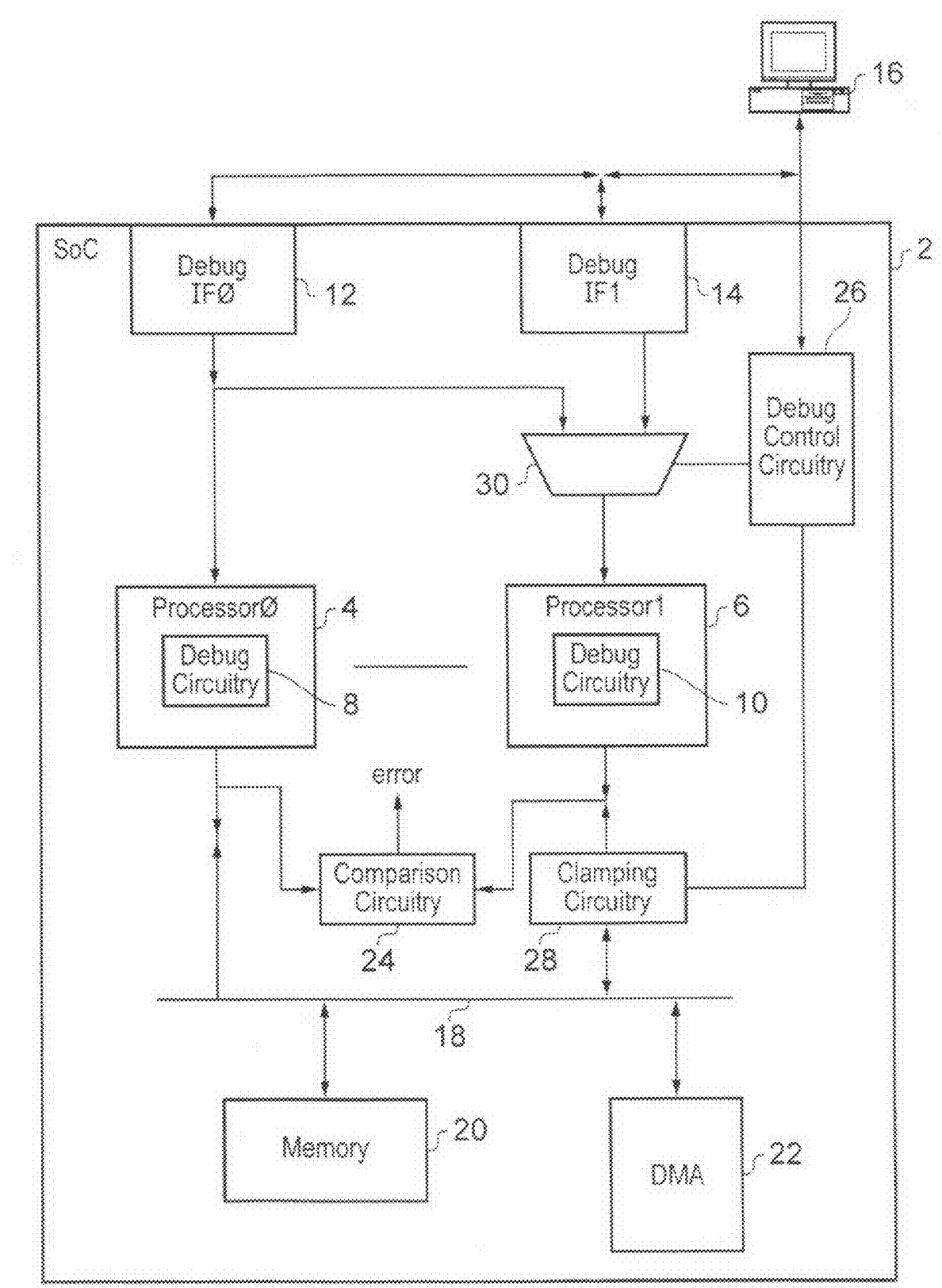
FIG. 1 schematically illustrates a system-on-chip integrated circuit including a plurality of processors with associated debug circuitry and which operate in either a split mode or a locked mode.

FIG. 1 schematically illustrates a system-on-chip integrated circuit 2 including a first processor 4 and a second processor 6. Associated with each of the processors 4, 6 are respective debug circuitry 8, 10 closely coupled to internal circuits and signals within the processor 4, 6. Debug interface circuitry 12, 14 is provided in respect of each of the processors 4, 6 and their respective debug circuitry 8, 10 to provide an interface to an external debug system 16 (such as a suitable programmed PC). The processors 4, 6 are connected via a shared bus 18 to further functional elements such as a memory 20 and a DMA engine 22. It will be appreciated that in practice the system-on-chip integrated circuit may typically include many other and/or different circuit elements depending upon the particular functionality required. The processor 4, 6 may each have an associated cache memory. In split mode and emulation-locked mode the processor 4, 6 have a dedicated cache (private cache). In the locked mode the processors 4, 6 share a cache memory.

The processor 4 and the processor 6 may operate in a split mode in which each executes its own program flow for high performance. The processors 4, 6 may also operate in a locked mode in which the processors 4, 6 are normalised to have the same state and then execute the same code on a cycle-by-cycle basis (although possibly with some cycle offset therebetween). When operating in the locked mode, comparison circuitry 24 serves to compare the output signals generated by the two processors 4, 6 and generates an error signal if there is any mismatch. This provides a degree of fault-tolerance (e.g. resistance to hard and/or soft errors).

When operating in the normal split mode, both the processors 4, 6 are active and the respective debug circuitry 8, 10 within each of the processors 4, 6 is active and will change the debug state data to perform diagnostic operations upon their respective processor 4, 6. In the locked mode (or debug-locked mode) both the processors 4, 6 are active and execute the same program flow and each of the instances of the debug circuitry 8, 10 is also active and updates its debug state data to debug the locked mode of operation.

The debug interface circuitry 12, 14 provides respective communication with the external diagnostic system 16 such that the debug circuitry 8, 10 can be separately programmed and monitored as desired.

Debug control circuitry 26 serves to control and coordinate the action of the debug circuitry 8, 10, the debug interface circuits 12, 14 and the various other circuit elements which take part in the debug operation. In particular, clamping circuitry 28 is provided associated with at least the outputs of the processor 6 (the inputs to the processor 6 may also be clamped, but this need not be the case if the remainder of the system is arranged not to assert these inputs while the processor 6 is inactive. In addition to the previously described modes of operation, there is provided an emulation-locked mode that is useful in debugging entry to and exit from the locked mode. In the emulation-locked mode the debug control circuitry 26 controls the processors 4, 6 and the debug circuitry 8, 12 such that the processor 4 is active and after normalisation executes the normal program flow to be expected in the locked-mode whereas the processor 6 is held inactive and maintains its state including its debug state data associated with the debug circuitry 10. Thus, the debug state data indicative of behaviour when entering the locked mode and when exiting the locked mode can be examined. This contrasts with the behaviour of the debug circuitry 8 within the active processor 4 which may change its debug state in the emulation-locked mode and so may not preserve the debug state data indicative of behaviour prior to entry into the locked mode. The clamping circuitry 28 controlled by the debug control circuitry 26 serves to hold the output signals from the processor 6 when it is inactive in a predetermined state such that the processor 6 does not influence the behaviour of the rest of the system. In addition, the clamping circuitry 28 if required may maintain the input signal values to the processor 6 such that it will not alter its state during the emulation-locked mode. Entry into the emulation-locked mode and exit from the emulation-locked mode (or more generally into and out of the locked mode) takes place at the same point in the program flow of the processor 6 (e.g. the same program counter value). This gives the effect of the processor 6 having its processing activity suspended for the duration of the emulation-locked mode and continuing its processing after the emulation-locked mode has been left starting from the same point at which the processor 6 was operating when the emulation-locked mode was entered.

When operating in a mode seeking to debug the locked operation itself (e.g. the normal locked mode if debug is always active or a debug-locked mode if debug needs activating), then both the processors 4, 6 will be active as well as both of the instances of the debug circuitry 8, 10. The debug circuitry 8, 10 will be normalised (e.g. by action of the external debug system 16) upon entry to the locked mode or debug-locked mode and the debug state data within each of the processors 4, 6, will track one another. In order that debug inputs supplied to the debug circuitry 8 are also applied to the debug circuitry 10, there is provided a multiplexer 30 controlled by the debug control circuitry 26 which serves to supply the debug circuitry 10 with the same inputs as are supplied to the debug circuitry 8 during this mode when seeking to debug the locked mode of operation itself.

FIG. 2 is a table illustrating the various modes of operation of the system-on-chip integrated circuit 2. In a split mode the processor 4 and the processor 6 are both active and the debug circuitry 8 and the debug circuitry 10 are both inactive. This corresponds to normal non-diagnostic split mode operation. There is, in this example, a separately provided debug-split mode in which the processor 4 is active and the processor 6 is active while the debug circuitry 8 and the debug circuitry 10 are also active. This permits the separate program flows within the different processors 4, 6 to be respectively debugged. In this debug-split mode the debug interfaces 12, 14 act independently and are programmed and interact with the diagnostic system 16 independently. It is possible to provide systems in which the debug circuitry 8 and the debug circuitry 10 are both active in the split mode and in this case there need not be a separate debug-split mode.

In a locked mode of operation the processor 4 and the processor 6 are both active and locked together so as to execute the same program flow. There may be a fixed offset (e.g. of a whole number or a half integer number of clock cycles) between the operation of the two processors 4, 6. In this locked mode, diagnostic operation is not required and so the debug circuitry 8 and the debug circuitry 10 are both inactive. When it is desired to debug the locked mode of operation a debug-locked mode may be re-entered. In this mode, both the processor 4 and the processor 6 are active and again executing in lock-step. The debug circuitry 8 and the debug circuitry 10 are also both active and are normalized and locked together. It is possible that the locked mode may include the ability for the debug circuitry 8, 10 to be permanently active and in this case there would not necessarily be a separate debug-locked mode.

Finally, the table of FIG. 2 illustrates the emulation-locked mode. In this emulation-locked mode, the processor 4 is active and the processor 6 is inactive and holds its state parameters (outputs clamped and input values maintained). The debug circuitry 8 associated with the active processor 4 is active so as to debug the locked program flow (although only one processor is actually executing this program flow) while the debug circuitry 10 is held inactive and maintains its debug state data. Maintaining this debug state data during the emulation-locked mode preserves this state for when the processor 6 becomes active again in split mode. One use of this capability is to assist debugging of entry and exit into the locked mode.

Figure 3:
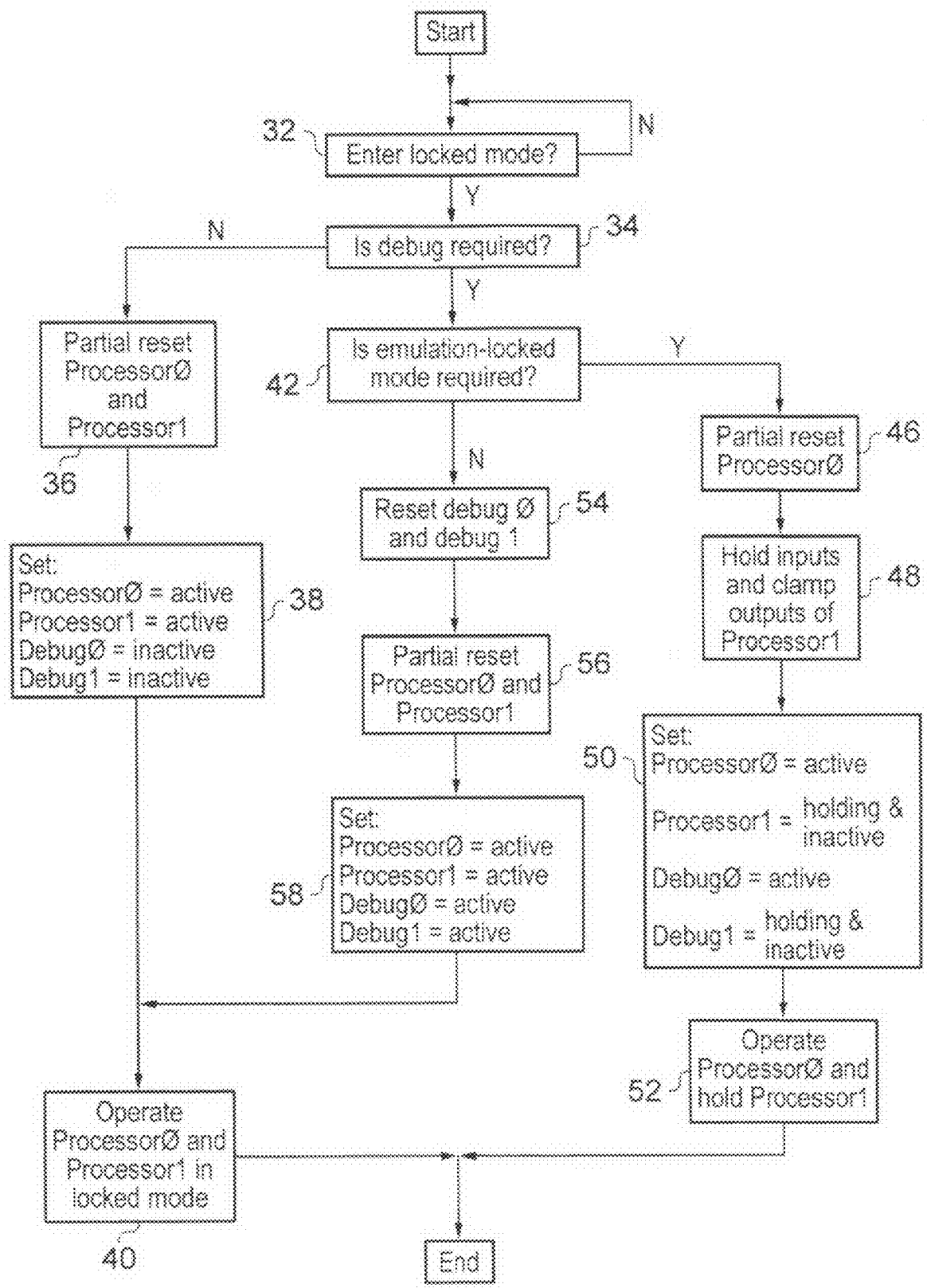
FIG. 3 is a flow diagram schematically illustrating the entry into locked mode, emulation-locked mode or debug-locked mode.

FIG. 3 is a flow diagram schematically illustrating entry into the various locked modes of operation. At step 32 the system waits for entry into a locked mode to be requested. Step 34 determines whether debug is required. If debug is not required, then normal locked mode is being entered. Processing thus proceeds to step 36 where the processor 4 and the processor 6 are partially reset (and also execute normalising code) in order to normalise their state parameters before seeking to execute in a lock-step fashion. The different processors 4, 6 may take different amounts of time to normalize their state parameter before entering the locked mode. Each processor 4, 6 may be configured to enter a quiescent state (i.e. temporarily inactive) once it is normalized. When both processors 4, 6 are detected as being normalized (e.g. both are in their quiescent state), a wake-up signal may be sent to both processors 4, 6 to trigger them to start lock-step processing. At step 38 the processor 4 is set active, the processor 6 is set active, the debug circuitry 8 is set inactive and the debug circuitry 10 is set inactive. At step 40 both the processor 4 and the processor 6 operate in the locked mode to execute the same program flow on a cycle-by-cycle basis.

If the determination at step 34 was that debug is required, then step 42 determines whether emulation-locked mode is required. This may be a request sent by the diagnostic system 16 (or elsewhere in the system-on-chip integrated circuit 2) to the debug control circuitry 26. If emulation-locked mode is required, then this is indicative of seeking to debug the entry and exit of the locked mode. If emulation-locked mode is required then step 46 then normalises the processor 4 (hardware partial reset and normalising code). Step 48 uses the clamping circuitry 28 acting under control of the debug control circuitry 26 to hold the inputs of the processor 6 at their values immediately prior to entry into the emulation-locked mode and to clamp the outputs of the processor 6 to predetermined values. Step 50 then sets processor 4 active, processor 6 inactive and holding its state parameters, debug circuitry 8 active and debug circuitry 10 inactive and holdings its debug state data. Step 52 operates processor 4 to execute the normal locked mode program flow while processor 6 is held inactive and merely maintains its state.

If the determination at step 42 is that the emulation-locked mode is not required, then step 54 resets the debug circuitry 8 and the debug circuitry 10. Step 56 then normalises the processor 4 and the processor 6 (partial reset signals and normalising code). Step 58 then sets the processor 4 active, the processor 6 active and the debug circuitry 8 active and the debug circuitry 10 active. Step 40 then operates the processor 4 and the processor 6 in locked mode in which lock-step execution of the same program flow is performed and the debug state data in each of the debug circuitry 8, 10 is updated to debug this locked mode execution.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
   a plurality of processors, each processor including debug circuitry having debug state data and configured to perform debug operations upon said processor;
   comparison circuitry configured to compare processing results of different processors of said plurality of processors; and
   debug control circuitry configured to control said debug circuitry of each of said plurality of processors, wherein said plurality of processors and said debug control circuitry are configured to provide:
   (i) a locked mode of operation in which each of said plurality of processors separately and during a corresponding processing cycle executes a common processing operation to generate respective processing results, said processing results of different processors compared by said comparison circuitry to identify incorrect operation;
   (ii) a split mode of operation in which each of said plurality of processors separately and during said corresponding processing cycle executes a different processing operation to generate respective different processing results; and
   (iii) an emulation-locked mode of operation in which at least one processor of said plurality of processors is an active processor and said debug circuitry of said active processor is configured to perform debug operations upon said active processor including changing said debug state data of said debug circuitry of said active processor and at least one processor of said plurality of processors is an inactive processor and maintains said debug state data of said inactive processor unaltered, wherein said inactive processor is configured to resume processing upon switching from said emulation-locked mode of operation to said split mode of operation without loss of the debug data from before entry into the emulation-locked mode of operation.

2. Apparatus as claimed in claim 1, wherein said plurality of processors and said debug control circuitry are configured to provide:
   (iv) a debug-split mode in which each processor of said plurality of processors is an active processor and respective debug circuitry in each active processor performs debug operations upon said active processor including changing said debug state data of said debug circuitry of said active processor.

3. Apparatus as claimed in claim 1, wherein when operating in said emulation-locked mode a single processor of said plurality of processors is an active processor and all other processors of said plurality of processors are inactive processors.

4. Apparatus as claimed in claim 1, wherein said plurality of processors and said debug control circuitry are configured to provide:
   (v) a debug-locked mode in which each processor of said plurality of processors is an active processor and respective debug circuitry in each active processor performs debug operations upon said active processor including changing said debug state data of said debug circuitry of said active processor.

5. Apparatus as claimed in claim 4, wherein when operating in said debug-locked mode, corresponding changes are made in said debug state data of each of said plurality of processors to maintain a common state of each of said plurality of processors.

6. Apparatus as claimed in claim 4, wherein upon entering said debug-locked mode, said debug control circuitry normalises said debug state data of each active processor within said plurality of processors such that each of said active processors has common debug state data.

7. Apparatus as claimed in claim 2, wherein said split mode and said debug-split mode are a common mode.

8. Apparatus as claimed in claim 5, wherein said locked mode and said debug-locked mode are a common mode.

9. Apparatus as claimed in claim 1, comprising clamping circuitry active in said emulation-locked mode to clamp output signals of each inactive processor to predetermined values.

10. Apparatus as claimed in claim 1, comprising clamping circuitry active in said emulation-locked mode to hold input signals of each inactive processor to maintain their values when said emulation-locked mode was entered.

11. Apparatus as claimed in claim 1, wherein an inactive processor in said emulation-locked mode retains at least some configuration parameters of an active processor in said locked mode, said configuration parameters being different in said locked mode.

12. Apparatus as claimed in claim 11, wherein said configuration parameters is cache memory configuration.

13. Apparatus as claimed in claim 1, wherein said plurality of processors each execute a stream of program instructions following a program flow and each inactive processor enters and exits said emulation-locked mode at a common point within said program flow for that inactive processor.

14. Apparatus as claimed in claim 1, wherein said plurality of processor and said debug circuitry are configured to permit mode switching between said split mode and said locked mode and between said split mode and said emulation-locked mode.

15. Apparatus as claimed in claim 1, wherein said plurality of processor and said debug circuitry are configured not to permit mode switching between said locked mode and said emulation-locked mode.

16. Apparatus as claimed in claim 1, wherein said plurality of processor comprises two processors.

17. Apparatus as claimed in claim 1, wherein when entering said locked mode from said split mode each of said plurality of processors is switched to a quiescent state and when all of said plurality of processor are in said quiescent state a wake-up signal sent to each of said plurality of processors triggers a state of execution in said locked mode.

18. Apparatus for processing data comprising:
a plurality of processor means for performing processing operations, each processor means including debug means for performing debug operations upon said processor means and having debug state data;
comparison means for comparing processing results of different processors means of said plurality of processor means; and
debug control means for controlling said debug means of each of said plurality of processor means, wherein said plurality of processor means and said debug control means provide:
(i) a locked mode of operation in which each of said plurality of processor means separately and during a corresponding processing cycle executes a common processing operation to generate respective processing results, said processing results of different processor means compared by said comparison means to identify incorrect operation; and
(ii) a split mode of operation in which each of said plurality of processor means separately and during said corresponding processing cycle executes a different processing operation to generate respective different processing results; and
(iii) an emulation-locked mode of operation in which at least one processor means of said plurality of processor means is an active processor means and said debug means of said active processor means is configured to perform debug operations upon said active processor means including changing said debug state data of said debug means of said active processor means and at least one processor means of said plurality of processor means is an inactive processor means and maintains said debug state data of said inactive processor means unaltered, wherein said inactive processor means is configured to resume processing upon switching from said emulation-locked mode of operation to said split mode of operation without loss of the debug data from before entry into the emulation-locked mode of operation.

19. A method of operating an apparatus for processing data having a plurality of processors, each processor including debug circuitry having debug state data and configured to perform debug operations upon said processor, comparison circuitry configured to compare processing results of different processors of said plurality of processors and debug control circuitry configured to control said debug circuitry of each of said plurality of processors, said method comprising the steps of operating said plurality of processors and said debug control circuitry to provide:
(i) a locked mode of operation in which each of said plurality of processors separately and during a corresponding processing cycle executes a common processing operation to generate respective processing results, said processing results of different processors compared by said comparison circuitry to identify incorrect operation; and
(ii) a split mode of operation in which each of said plurality of processors separately and during said corresponding processing cycle executes a different processing operation to generate respective different processing results; and
(iii) an emulation-locked mode of operation in which at least one processor of said plurality of processors is an active processor and said debug circuitry of said active processor is configured to perform debug operations upon said active processor including changing said debug state data of said debug circuitry of said active processor and at least one processor of said plurality of processors is an inactive processor and maintains said debug state data of said inactive processor unaltered, wherein said inactive processor is configured to resume processing upon switching from said emulation-locked mode of operation to said split mode of operation, said steps implemented on said apparatus for processing data without loss of the debug data from before entry into the emulation-locked mode of operation.

\* \* \* \* \*